United States Patent [19]

Koizumi et al.

[11] Patent Number: 4,819,194
[45] Date of Patent: Apr. 4, 1989

[54] COORDINATE INPUTTING SYSTEM WITH PROVISION FOR ERRONEOUS INPUT DETECTION

[75] Inventors: Haruyuki Koizumi, Kyoto; Hideki Sato, Takatsuki; Shinichi Hashizume, Kusatsu; Koichi Omae, Kyoto, all of Japan

[73] Assignee: Omron Tateisi Electronics Co., Kyoto, Japan

[21] Appl. No.: 56,892

[22] Filed: Jun. 3, 1987

[30] Foreign Application Priority Data

Jun. 18, 1986 [JP] Japan .................................. 61-143811

[51] Int. Cl.$^4$ .............................................. G08C 21/00
[52] U.S. Cl. .............................. 364/556; 364/709. 11; 178/18
[58] Field of Search .................... 364/556, 709, 709.11; 178/18

[56] References Cited

U.S. PATENT DOCUMENTS

| | | | |
|---|---|---|---|
| 4,571,454 | 2/1986 | Tamaru et al. | 178/18 |
| 4,571,577 | 2/1986 | Taupin et al. | 178/18 |
| 4,616,106 | 10/1986 | Fowler et al. | 178/18 |
| 4,725,696 | 2/1988 | Furukawa et al. | 178/18 |

*Primary Examiner*—David H. Malzahn
*Attorney, Agent, or Firm*—Stevens, Davis, Miller & Mosher

[57] ABSTRACT

In this coordinate inputting system, a coordinate inputting sheet is provided for detecting an axial coordinate, and this includes a sheet body with a resistive surface laid over one of its sides, a pair of mutually substantially parallel edge electrodes extending along opposite edges of this resistive surface which are for having voltage applied between them, and several intermediate electrodes, substantially mutually parallel and substantially parallel to the pair of edge electrodes, and extending along the resistive surface bewteen the pair of edge electrodes in a mutually spaced relationship. Also, there are provided a device for processing information by obtaining voltage divided at an input point selected by pen contact against the coordinate inputting sheet as axial coordinate information, a device for storing in advance reference information relating to the voltages on the electrodes when the voltage is applied between the edge electrodes, a device for detecting which of the electrodes straddle the input point by comparing the axial coordinate information obtained from the information processing device with the reference information, and a device for determining the validity of input operation according to the result of comparison between the voltages upon the electrodes which straddle the input point and the reference information. Optionally, the reference information may include the voltages on the electrodes when the voltage is applied between the edge electrodes, and the voltage differences between neighboring ones of the electrodes.

7 Claims, 6 Drawing Sheets

COORDINATE INPUTTING SYSTEM WITH PROVISION FOR ERRONEOUS INPUT DETECTION

BACKGROUND OF THE INVENTION

The present invention relates to a coordinate inputting system; more particularly the present invention relates to a coordinate inputting system which is suitable for being incorporated into a so called digitizer for inputting hand written letters and/or graphics, as for example into a computer system; and even more particularly the present invention relates to a coordinate inputting system, in which each coordinate position of a special pen such as a stylus type pen is inputted, as said special pen touches the surface of a coordinate inputting sheet. This point of contact of the special pen upon the coordinate inputting sheet will hereinafter be referred to as the "input point".

The present inventors wish hereby to attract the attention of the examining authorities to copending patent application Ser. No. 055,946, filed June 1, 1987 which may be considered to be material to the examination of the present patent application.

In the prior art, there have been proposed various types of coordinate inputting systems. One such prior art type coordinate inputting system is illustrated in FIG. 7 of the accompanying drawings in exploded perspective view. In this figure, the reference symbol 1A denotes a X coordinate inputting sheet, which has a resistive surface 4A on its one side and a pair of electrodes 2A and 3A laid along its opposite edges and in contact with opposite edges of said resistive surface 4A. And, similarly, the reference symbol 1B denotes a Y coordinate inputting sheet, which has a similar resistive surface 4B on its one side and a similar pair of electrodes 2B and 3B laid along its opposite edges and in contact with opposite edges of said resistive surface 4B. These two X and Y coordinate inputting sheets 1A and 1B are laid together in a mutually parallel relationship with their electrodes 2A, 2B and 3A, 3B extending in a mutually skew perpendicular relationship.

With such a coordinate inputting system, when a tip of a special pen touches the upper or outside surface of the X coordinate inputting sheet 1A and presses on it, while at the same time certain voltages are applied between the electrodes 2A and 3A of the X coordinate inputting sheet 1A and 3A and 3B of the Y coordinate inputting sheet 1B, then divided voltages will be produced respectively from said X coordinate inputting sheet 1A and said Y coordinate inputting sheet 1B as X and Y coordinate information.

There is however a problem with such a coordinate inputting system, in that, when a part of the hand or the arm of the operator, such as his or her wrist or elbow, inadvertently touches the upper or outside surface of the X coordinate inputting sheet 1A and presses on it, then this may produce an erroneous reading from this coordinate inputting system. In such a case, the obtained X and Y coordinate information will be a combination of the positional information generated by the tip of the pen, i.e. the correct and desired positional information, and of the positional information generated by this inadvertent user arm pressure, i.e. incorrect and spurious positional information. In such a case, an erroneous input indication may well be produced.

SUMMARY OF THE INVENTION

The inventors of the present invention have considered the various problems detailed above.

Accordingly, it is the primary object of the present invention to provide a coordinate inputting system, which avoids the problems detailed above.

It is a further object of the present invention to provide such a coordinate inputting system, which prevents the production of a spurious or erroneous input indication, if and when the user should inadvertently press upon said coordinate inputting system with an object other than a special pen intended for such pressing, such as by inadvertently resting a part of his or her arm upon said coordinate inputting system.

It is a further object of the present invention to provide such a coordinate inputting system, which can improve the accuracy of positional identification and detection, by detecting when a contact upon said coordinate inputting system other than by the tip of the pen is being produced.

It is further object of the present invention to provide such a coordinate inputting system, which can detect the validity of positional information which is produced.

According to the most general aspect of the present invention, these and other objects are attained by a coordinate inputting system, comprising: a coordinate inputting sheet for detecting an axial coordinate, comprising a sheet body with a resistive surface laid over one of its sides, a pair of mutually substantially parallel edge electrodes extending along opposite edges of said resistive surface and for having voltage applied between them, and a plurality of intermediate electrodes, substantially mutually parallel and substantially parallel to said pair of edge electrodes, and extending along said resistive surface between said pair of edge electrodes in a mutually spaced relationship; a means for processing information by obtaining voltage divided at an input point selected by pen contact against said coordinate inputting sheet as axial coordinate information; a means for storing in advance reference information relating to the voltages on said electrodes when said voltage is applied between said edge electrodes; a means for detecting which of said electrodes straddle the input point by comparing said axial coordinate information obtained from said information processing means with said reference information; and: a means for determining the validity of input operation according to the result of comparison between the voltages upon said electrodes which straddle the input point and said reference information. And, more particularly, said reference information may include the voltages on said electrodes when said voltage is applied between said edge electrodes, and the voltage differences between neighboring ones of said electrodes.

According to such a coordinate inputting system as specified above, in a stage preliminary to the actual operation of inputting coordinates of the input point, a voltage is applied between the edge electrodes, and the voltage levels of said edge electrodes as well as the voltage levels upon the intermediate electrodes are all measured and are stored in the storage means as reference information. Then, when the input point is specified upon the coordinate inputting sheet as for example by the pressure of a special pen thereupon, the means for processing information obtains the voltage divided at said input point as coordinate information. Then, this positional information is compared by the detecting means with the reference information stored in the storage means, and it is detected which of said electrodes straddle the input point. Further, the validity determining means checks the validity of the input operation according to the result of comparison between the voltages upon said electrodes which straddle the input point and said reference information, so as to ensure that, if invalid input such as produced by the pressure of the hand or elbow of the operator is being produced, this circumstance is detected, and an indication of erroneous operation is provided. Thereby, loss of measurement accuracy due to invalid input operation can be prevented, and the production of a spurious or erroneous input indication, if and when the user should inadvertently press upon said coordinate inputting system with an object other than a special pen intended for such pressing, is positively prohibited.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and flow chart steps and so on in the various figures; and:

DESCRIPTION OF THE PREFERRED EMBODIMENT

The present invention will now be described with reference to the preferred embodiment thereof, and with reference to the figures.

Figure 1:
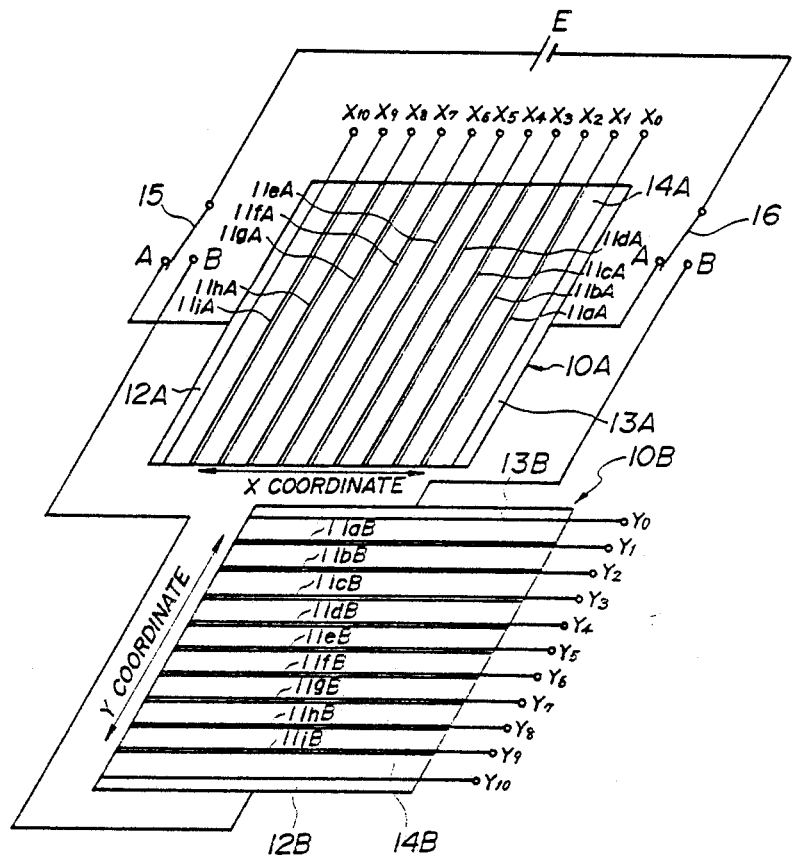
FIG. 1 is an exploded perspective view showing the physical construction of the preferred embodiment of the coordinate inputting system of the present invention.
Figure 2:
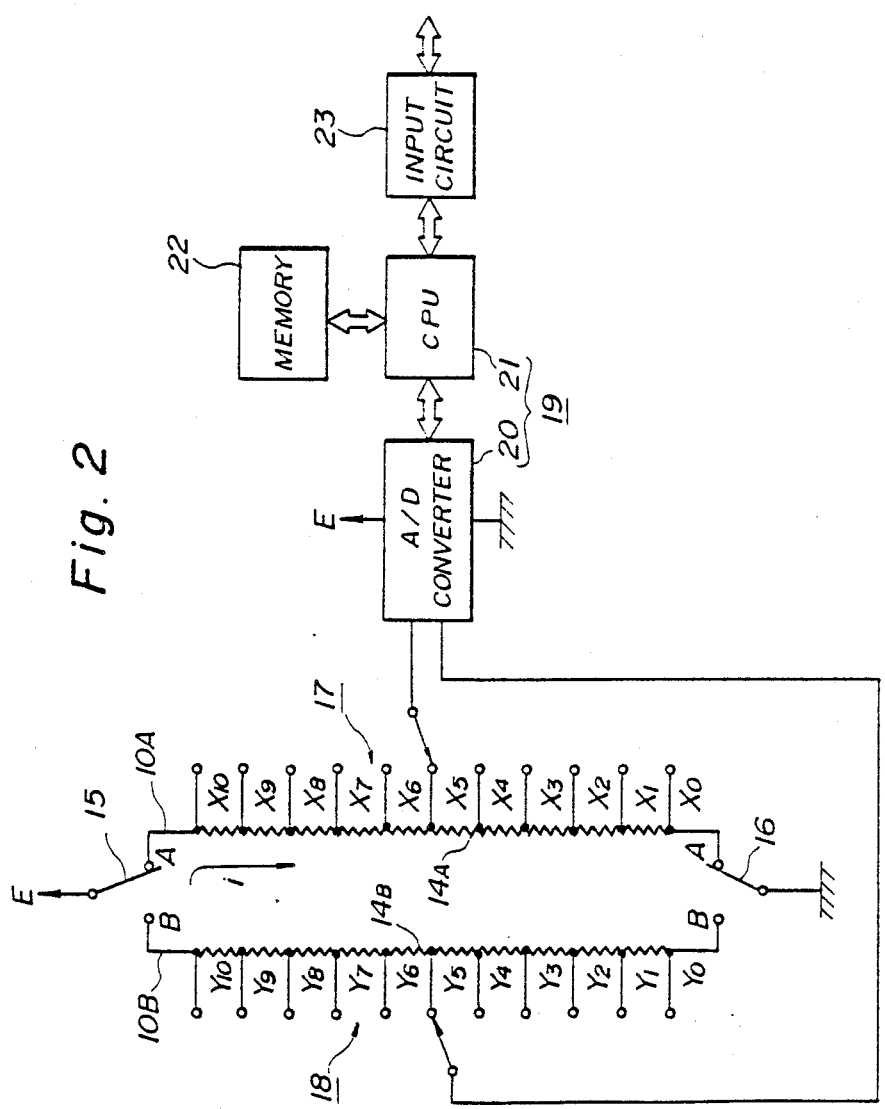
FIG. 2 is an equivalent circuit diagram for a pair of switchover circuits constituted by portions of the FIG. 1 construction, in the case that no point upon said construction whose X and Y coordinates are required to be inputted is being pressed, either legitimately by a special pen adapted for doing so or illegitimately by the hand or the elbow (for example) of the user.
Figure 3:
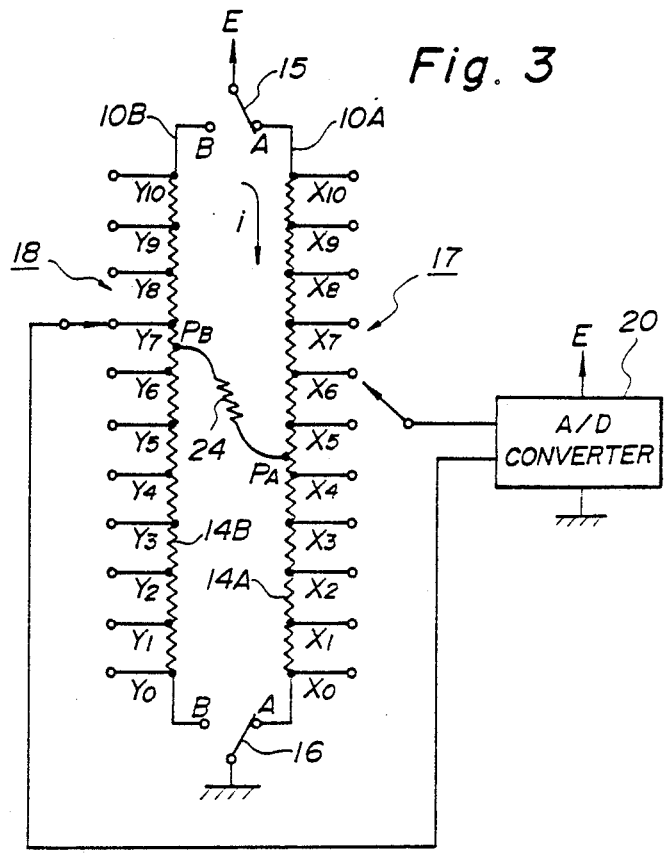
FIG. 3 is an equivalent circuit diagram for said pair of switchover circuits constituted by portions of the FIG. 1 construction, similar to FIG. 2, but showing the equivalent circuit in the case that a well defined point upon said construction whose X and Y coordinates are truly required to be inputted is being legitimately pressed as for example by a special pen adapted for doing so.
Figure 4:
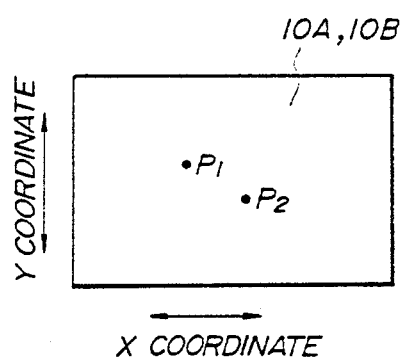
FIG. 4 is a plan view of the surface of this preferred embodiment of the coordinate inputting system of the present invention, in the case in which both a legitimate contact point P1 between X and Y coordinate inputting sheets thereof whose X and Y coordinates are truly required to be inputted is being pressed by a pen, and also another similar but illegitimate contact point P2 is being pressed, for example inadvertently by the pressure of a hand or elbow of an operator.

FIGS. 1 through 6 relate to this preferred embodiment of the coordinate inputting system of the present invention, and, as best shown in the exploded perspective view of FIG. 1 and the plan view of FIG. 4, this preferred embodiment comprises an X coordinate inputting sheet 10A for detecting the X coordinate of a point the coordinates of which it is desired to input, and a Y coordinate inputting sheet 10B for detecting the Y coordinate of a point the coordinates of which it is desired to input. The X coordinate inputting sheet 10A comprises a rectangular insulating sheet which is provided with a pair of linear electrodes 12A and 13A laid along two of its opposite edges, and further comprises a resistive surface (not particulary shown) formed on the surface of said rectangular insulating sheet. Similarly, the Y coordinate inputting sheet 10B comprises a rectangular insulating sheet which is provided with a pair of linear electrodes 12B and 13B laid along two of its opposite edges, and further comprises a resistive surface (not particularly shown) formed on the surface of said rectangular insulating sheet. And this X coordinate inputting sheet 10A and this Y coordinate inputting sheet 10B are laid together with their said resistive surfaces confronting one another, and with the pair of linear electrodes 12A and 13A of the X coordinate inputting sheet 10A extending skew perpendicular to the pair of linear electrodes 12B and 13B of the Y coordinate inputting sheet 10B. Further, on the rectangular insulting sheet of the X coordinate inputting sheet 10A there are provided a number of linear intermediate electrodes, nine in number in the shown preferred embodiment although this number thereof is not intended to be limiting, and designated as 11aA, 11bA, . . . 11iA, extending substantially parallel to and between the linear electrodes 12A and 13A thereof at a substantially uniform pitch, thereby dividing the area of said X coordinate inputting sheet 10A which is covered with said resistive surface into ten, in this shown preferred embodiment, strip portions of uniform width. Similarly, on the rectangular insulating sheet of the Y coordinate inputting sheet 10B there are provided a number of linear intermediate electrodes, again nine in number in the shown preferred embodiment although this number thereof is not intended to be limiting, and designated as 11aB, 11bB, . . . 11iB, extending substantially parallel to and between the linear electrodes 12B and 13B thereof at a substantially uniform pitch, thereby similarly dividing the area of said Y coordinate inputting sheet 10B which is covered with said resistive surface into ten, in this shown preferred embodiment, strip portions of uniform width.

During the use of this preferred embodiment of the coordinate inputting system of the present invention, as illustrated in FIG. 1, a voltage E, which conveniently may be approximately 5 volts, is selectively applied either between the linear electrodes 12A and 13A of the X coordinate inputting sheet 10A or between the linear electrodes 12B and 13B of the Y coordinate inputting sheet 10B, according to the selective operation of switches 15 and 16. The two linear electrodes 12A and 13A of the X coordinate inputting sheet 10A and the nine linear intermediate electrodes 11aA, 11bA, ... 11iA therebetween are terminated in terminals denoted as X0, X1, ... X10, and similarly the two linear electrodes 12B and 13B of the Y coordinate inputting sheet 10B and the nine linear intermediate electrodes 11aB, 11bB, ... 11iB therebetween are terminated in terminals denoted as Y0, Y1, ... Y10. These terminals X0 ... X10 and Y0 ... Y10 and the other portions of the X coordinate inputting sheet 10A and the Y coordinate inputting sheet 10B constitute a pair of switchover circuits 17 and 18, an equivalent circuit diagram for which is shown in FIG. 2 together with a schematic block diagram of an information processing circuit unit 19 to which said switchover circuits 17 and 18 are connected. It should be understood that the equivalent circuit diagram shown in FIG. 2 relates to the case that no point upon the preferred embodiment of the coordinate inputting system of the present invention is being pressed in order to indicate a point thereon whose X and Y coordinates are required to be inputted, either legitimately as for example by a special pen adapted for doing so or illegitimately by the hand or the elbow (for example) of the user.

This information processing circuit unit 19 is for producing positional information in terms of an X coordinate and a Y coordinate from voltages divided by an input point on the X coordinate inputting sheet 10A and the Y coordinate inputting sheet 10B, said input point being defined by the pressure of a pen to said X coordinate inputting sheet 10A and the Y coordinate inputting sheet 10B. The information processing circuit unit 19 comprises an A/D converter (analog-digital converter) 20 for converting the thus divided voltages, which are analog quantities, into digital signals, and further comprises a CPU (central processing unit) 21 which receives said digital signals and computes the above defined X coordinate and Y coordinate of the input point according to certain arithmetic processes. This CPU 21 is connected to a memory unit 22 and to an input circuit 23 via a bus, thus constituting a micro computer system of a per se conventional type, further description of which will therefore be omitted. And said micro computer system provides the function of controlling the actions of the switches 15 and 16 and of the switching circuits 17 and 18, the function of detecting the ones for both the X and the Y coordinates of the electrodes 12, 13, and 11a through 11i which bracket the input point, the function of detecting the validity of the input operation, and the function of computing the coordinates.

The memory means 22 comprises a quantity of read only memory (ROM) which permanently stores the programs for the coordinate inputting process and reference information, and also comprises a quantity of RAM (random acess memory) which is used for storing various data which are read as well as various intermediate results. Further, reference information for detecting the ones for both the X and the Y coordinates of the electrodes 12, 13, and 11a through 11i which bracket the input point, and for detecting the validity of the input operation, is stored in this RAM prior to the coordinate inputting operation.

This reference information relates to the voltages on the electrodes 12, 13 and 11a through 11i for both the X and the Y coordinates, i.e. for said X coordinate inputting sheet 10A and said Y coordinate inputting sheet 10B, and FIG. 2, which is illustrates how this reference information for said X coordinate inputting sheet 10A and said Y coordinate inputting sheet 10B is generated. That is, as shown in FIG. 2, first (for example) the switches 15 and 16 are thrown to the "A" side, and then the voltage E is applied across the opposing electrodes 12A and 13A of the X coordinate inputting sheet 10A. In this condition, the electrodes 11aA, 11bA, ... 11iA are sequentially accessed, and the voltage levels upon all of these electrodes 12A and 13A and these electrodes 11aA, 11bA, ... 11iA are measured. And, after the voltage differences between the neighboring electrodes are computed by the CPU 21 from the data detected, the voltage levels upon all of these electrodes 12A and 13A and these electrodes 11aA, 11bA, ... 11iA and the voltage differences between the neighboring electrodes are stored in the memory means 22. Then next (for example) the switches 15 and 16 are thrown to the "B" side, and then the voltage E is applied across the opposing electrodes 12B and 13B of the Y coordinate inputting sheet 10B. In this condition, the electrodes 11aB, 11bB, ... 11iB are similarly sequentially accessed, and the voltage levels upon all of these electrodes 12B and 13B and these electrodes 11aB, 11bB, ... 11iB are measured. And, after the voltage differences between the neighboring electrodes are computed by the CPU 21 from the data detected, the voltage levels upon all of these electrodes 12B and 13B and these electrodes 11aB, 11bB, ... 11iB and the voltage differences between the neighboring electrodes are again stored in the memory means 22.

FIG. 3 is an equivalent circuit diagram for said pair of switchover circuits constituted by portions of the FIG. 1 construction, similar to FIG. 2, but showing the equivalent circuit in the case that a well defined point upon said construction whose X and Y coordinates are truly required to be inputted is being legitimately pressed as for example by a special pen adapted for doing so. At this time the X coordinate inputting sheet 10A and the Y coordinate inputting sheet 10B are being brought into mutual contact at certain definite points thereof. In particular, in FIG. 3, the reference numerals 14A and 14B denote the resistive surfaces of the X coordinate inputting sheet 10A and the Y coordinate inputting sheet 10B respectively, and the points thereof which are in mutual contact are respectively denoted as PA and PB. And the contact resistance between these contact points PA and PB is denoted as 24, while the current value flowing through the resistive surfaces 14A and 14B is denoted as i. In the particular illustrative case shown in FIG. 3, the ones 11dA and 11eA of the intermediate electrodes 11aA ... 11iA on the X coordinate inputting sheet 10A, which are respectively connected to the terminals X4 and X5, are the ones which bracket the point PA of contact of said X coordinate inputting sheet 10A against the Y coordinate inputting sheet 10B. Similarly, the ones 11fB and 11gB of the intermediate electrodes 11aB ... 11iB on the Y coordinate inputting sheet 10B, which are respectively connected to the terminals Y6 and Y7, are the ones which bracket the point PB of contact of said Y coordinate inputting sheet 10B against the X coordinate inputting sheet 10A. Thus, when the switches 15 and 16 are selected to their A sides as shown in FIG. 3, the voltage E which is being applied between the electrodes 12A and 13A of the X coordinate inputting sheet 10A is divided by this input point PA, and this voltage is brought out from the intermediate electrode 11gB when the switching circuit 18 selects the terminal Y7 which is connected to said intermediate electrode 11gB. If there are altogether a number n of parts into which the resistive surface of the Y coordinate inputting sheet 10B is divided by the intermediate electrodes 11aB ... 11iB, then the resistance between the point PB of contact of said Y coordinate inputting sheet 10B against the X coordinate inputting sheet 10A and the closest one of said intermediate electrodes 11aB ... 11iB is at most ½n of the total resistance of said resistive surface of the Y coordinate inputting sheet 10B. Thereby, the input resistance of the A/D converter 20 is kept low, and the margin of error in the A/D conversion process performed thereby can be minimized.

In the particular illustrative case shown in FIG. 3, the ones 11dA and 11eA of the intermediate electrodes 11aA ... 11iA on the X coordinate inputting sheet 10A, which are respectively connected to the terminals X4 and X5, are the ones which bracket the point PA of contact of said X coordinate inputting sheet 10A against the Y coordinate inputting sheet 10B. And the switching circuit 17 sequentially selects the ones X4 and X5 of the terminals which are connected to said intermediate electrodes 11dA and 11eA so that the voltage levels upon said intermediate electrodes 11dA and 11eA can be read out by the A/D converter 20, as will be described hereinafter in greater detail. Since the point of contact between the X coordinate inputting sheet 10A and the Y coordinate inputting sheet 10B occurs at the point PA, the same current I flows through the resistive surface 14A before and after the pen contact, and therefore there are no changes in the voltages at the terminals X4 and X5. Here, it is assumed that the input impedance of the A/D converter 20 is sufficiently higher than the resistance of the resistive surface 14A, and that the current flowing into or out of the A/D converter 20 is negligibly small, as compared with the current i which flows through the resistive surfaces 14A and 14B.

Figure 5:
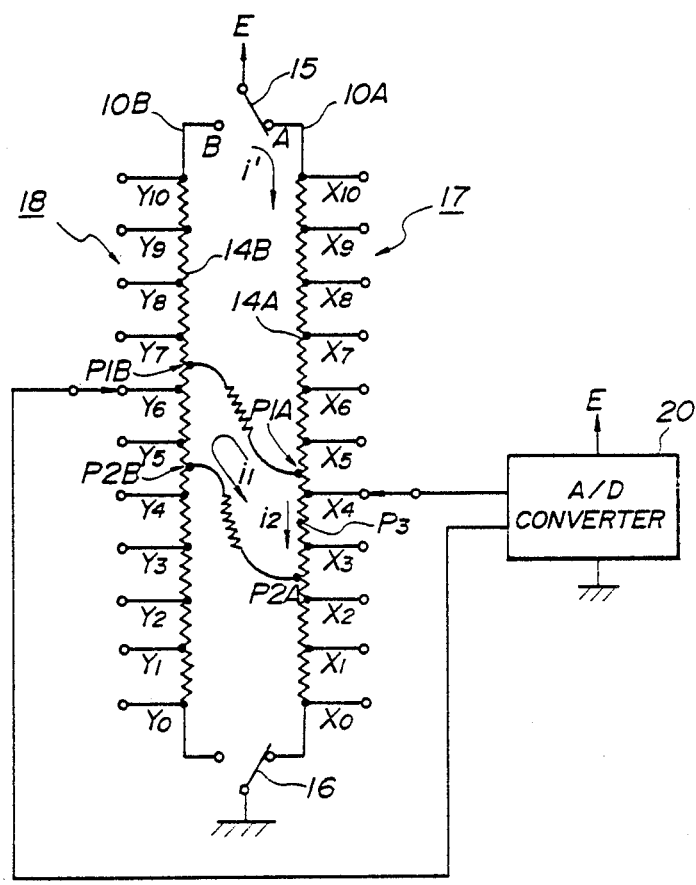
FIG. 5 is an equivalent circuit diagram for said pair of switchover circuits constituted by portions of the FIG. 1 construction, similar to FIGS. 2 and 3, but relating to this alternative case that such an additional illegitimate point upon said construction (whose X and Y coordinates are not in fact truly required to be inputted) is being illegitimately pressed, for example by the hand or the elbow of an operator.

Now, in FIG. 4, there is shown the surface of this preferred embodiment of the coordinate inputting system of the present invention in the case in which not only is there a legitimate contact point P1 between the X coordinate inputting sheet 10A and the Y coordinate inputting sheet 10B which is being caused by the pressure of the pen for inputting X and Y coordinates as before, but also, additionally, there is another illegitimate contact point P2 between said X coordinate inputting sheet 10A and said Y coordinate inputting sheet 10B which is being caused for example by the pressure of a hand or elbow of an operator. And FIG. 5 shows an equivalent circuit diagram for the pair of switchover circuits. This figure is similar to FIGS. 2 and 3, but relates to this alternative case that such an additional illegitimate point upon said construction, whose X and Y coordinates are not in fact truly required to be inputted, is being illegitimately pressed. In this case, the two separated points of said resistive surfaces 14A and 14B of said X coordinate inputting sheet 10A and said Y coordinate inputting sheet 10B which are in mutual contact are respectively denoted as P1A and P2A, and P1B and P2B.

In the illustrated state, the current i' which flows into the resistive surface 14A of the X coordinate inputting sheet 10A additionally flows to the Y coordinate inputting sheet 10B from the input point P1A, and between the two input points P1A and P2A a current designated as i2 flows into the X coordinate inputting sheet 10A, while a current designated as i1 flows into the Y coordinate inputting sheet 10B. In other words, the resistance between the two input points P1A and P2A becomes lower than it was before the contacts took place, and the current i' through the X coordinate inputting sheet 10A is greater than when there is no contact, or when there is only one point of contact.

Thus, when there are two points of contact between the X coordinate inputting sheet 10A and the Y coordinate inputting sheet 10B, an intermediate point P3 between the two points of contact P1A and P2A appears to be the actual point of contact, and the divided voltage at this apparent point of contact P3 is given as a combination of the voltages at the two actual points of contact P1A and P2A. In the illustrated example, the apparent input point P3 is interposed between the intermediate electrodes P1A and P2A (the terminals X3 and X4), and then the voltage difference between the intermediate electrodes 11cA and 11dA becomes less than when there is no contact or when there is only one point of contact between the X coordinate inputting sheet 10A and the Y coordinate inputting sheet 10B, because the current i' is divided into the two currents i1 and i2 between the input points P1A and P2A.

Thus, according to the present invention, by measuring the voltage difference between these electrodes, and by comparing the measured voltage with a voltage difference value included in the reference information, the existence of two separate points of contact on the surface of the preferred embodiment of the coordinate inputting system of the present invention, in other words the illegitimacy of the current inputting operation, is detected.

Figure 6:
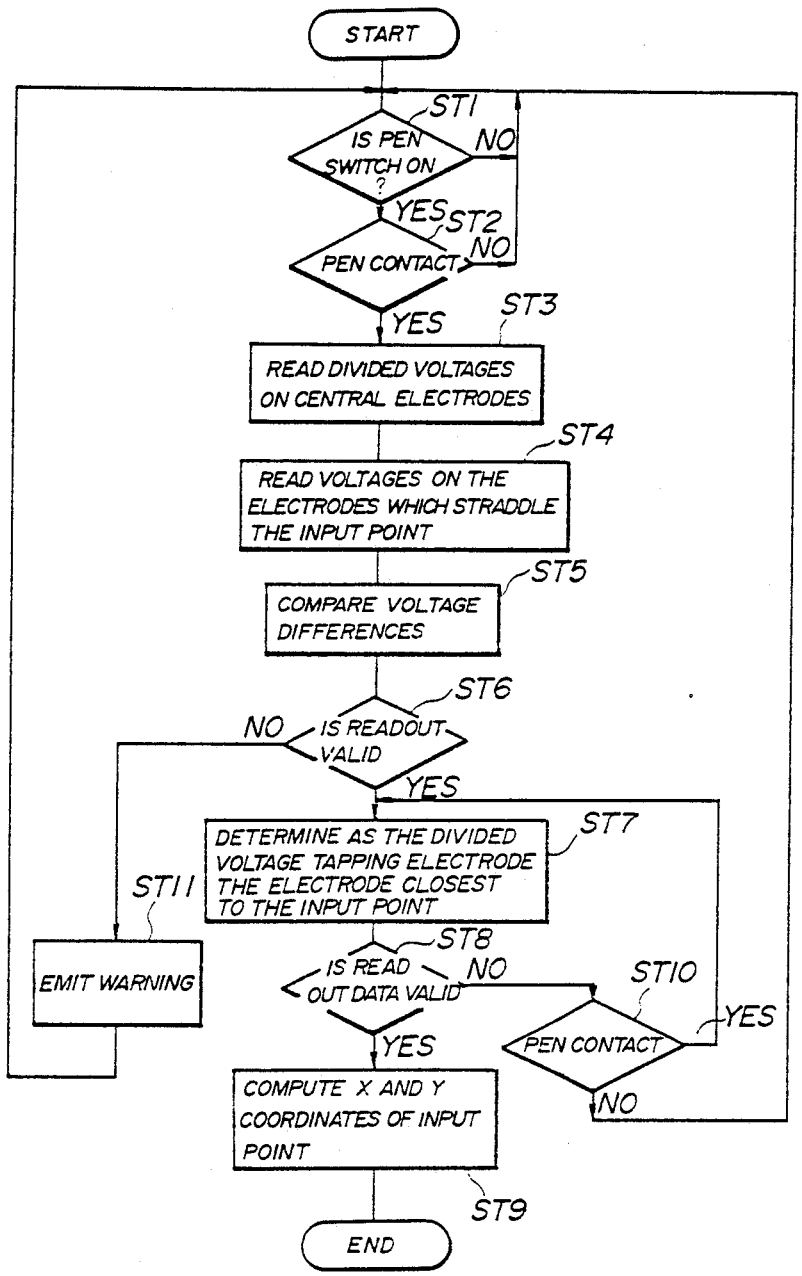
FIG. 6 is a partial flow chart for illustrating a portion of a program stored in and obeyed by a micro computer incorporated in said coordinate inputting system, to realize the operation of the preferred embodiment of the coordinate inputting system of the present invention, said program portion being executed at regular and appropriate intervals.
Figure 7:
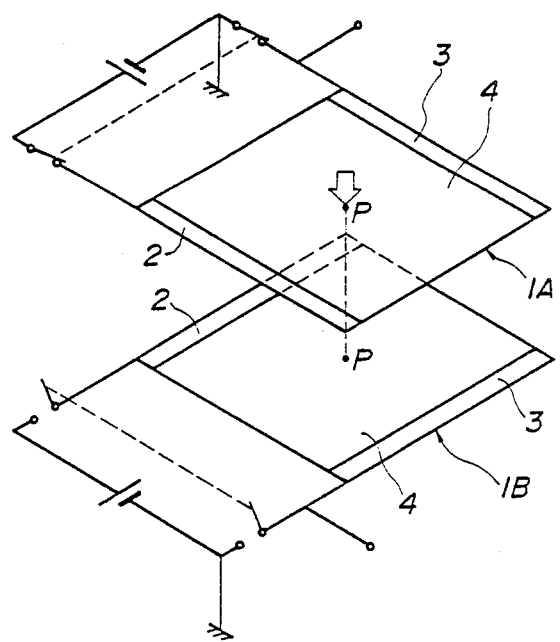
FIG. 7, which relates to the prior art and is similar to FIG. 1 relating to the preferred embodiment of the coordinate inputting system of the present invention, shows a prior art type coordinate inputting system.

Now, in FIG. 6, a fragmentary flow chart is shown for a portion of the control program which directs the operation of the micro computer incorporating the CPU 21, according to the preferred embodiment of the coordinate inputting system of the present invention, so as to realize its function. The flow chart of FIG. 6 only shows a portion of the control program of the micro computer, and is executed at suitably spaced regular intervals. The intimate programming details relating to this FIG. 6 flow chart will not be particularly described herein in detail, because the details thereof can be easily supplemented by one of ordinary skill in the programming art based upon the functional disclosures set out in this specification. This flow chart will now be explained.

First, before the START block of the FIG. 6 flow chart, the switching circuits 17 and 18 sequentially access the terminals X0 through X10 and Y0 through Y10, while the voltage E is applied alternately across the electrodes 12A and 13A of the X coordinate inputting sheet 10A, and across the electrodes 12B and 13B of the Y coordinate inputting sheet 10B. And during this process the voltages upon the opposing electrodes 12B and 13B, and 12A and 13A, as well as the voltages upon the terminals X0 through X10 and Y0 through Y10, are read out; and the voltage differences between the neighboring pairs of electrodes are computed by the CPU 21.

Since the positions of the intermediate electrodes 11aA through 11iA between the electrodes 12A and 13A on the X coordinate inputting sheet 10A, and of the intermediate electrodes 11aB through 11iB between the electrodes 12B and 13B on the Y coordinate inputting sheet 10B, are known, these voltages and voltage differences can be stored in the memory 22 as reference information, using the positions, for example, as addresses.

Now, when upon the completion of the above described preliminary process an input point is indicated to this preferred embodiment of the coordinate inputting system of the present invention by a special pen being used to press upon the surface thereof, for the first time the results of the decisions in the decision steps ST1 and ST2 of the FIG. 6 flow chart both are YES, and the flow of control passes to the step ST3. In this step ST3, the CPU 21 turns both of the switches 15 and 16 to their A positions, and causes the switching circuit 18 to select the terminal Y5; and then the flow of control passes next to the step ST4. As a result of this step, the divided voltage of the input point PA on the X coordinate inputting sheet 10A is produced from the intermediate electrode 11eB which is located in the middle of the Y coordinate inputting sheet 10B, as X coordinate positional information. Then, as the switches 15 and 16 are thrown to their B positions, and the switching circuit 18 is caused to select the terminal X5, the divided voltage of the input point PB on the Y coordinate inputting sheet 10B is produced from the intermediate electrode 11eA which is located in the middle of the X coordinate inputting sheet 10A, as Y coordinate positional information.

These divided voltages are converted into digital signals by the A/D converter 20, and are supplied to the CPU 21. This CPU 21 then, in the step ST4, determines which of the electrodes it is that straddle the input point, for each of the X coordinate inputting sheet 10A and the Y coordinate inputting sheet 10B, by comparing the obtained data with the voltages on the intermediate electrodes 11a through 11i of that inputting sheet which are stored in the memory means 22. Further, by controlling the switching circuits 17 and 18 sequentially to select the terminals corresponding to the respective electrodes, the CPU 21 detects the voltage on each of the electrodes and the voltage differences between each pair of neighboring electrodes, and stores the measured results in the memory means 22. Then the flow of control passes next to the step ST5.

In the next step ST5, the CPU 21 compares the voltage difference between the pairs of the electrodes which straddle the input point, obtained in the step ST4, with the corresponding voltage difference included in the memorized information stored in the memory means 22, and then the flow of control passes next to the decision step ST6. When the difference is less than a certain threshold level, then in this decision step ST6 a decision is made that the input point is a valid input point due to a single point contact of the pen, and in this case the flow of control passes next to the step ST7. On the other hand, if this difference is greater than said certain threshold level, then in this decision step ST6 a decision is made that the input point is not a valid input point, being due to a two or more point contact, and is therefore due to, for example, the pressure of the arm or elbow of the user as well as perhaps being due to a single point contact of the pen, and in this erroneous case the flow of control passes next to the step ST11. In this step ST11, the system emits a warning to the user as for example by sounding a buzzer or the like, so as to notify said user that his or her input is invalid, and in this case the CPU 21 either terminates the input coordinate measuring process or suspends the output of the measurement results of coordinate measurement.

However, if the result of the decision in this step ST6 is in fact YES, so that it is decided that the input operation is currently a valid one, then in the next step ST7 the CPU 21 determines, both for the X coordinate inputting sheet 10A and for the Y coordinate inputting sheet 10B, which of the intermediate electrodes 11a through 11i of said sheet is the closest to the input point, by comparing the divided voltage data obtained in the step ST3 with the voltages of the intermediate electrodes 11a through 11i that are stored in the memory means 22; and these determined upon electrodes are designated as so called divided voltage tapping electrodes. In the following, it will be assumed that the one of the electrodes for the X coordinate inputting sheet 10A which is the determined upon divided voltage tapping electrode is 11dA and the one of the electrodes for the Y coordinate inputting sheet 10B which is the determined upon divided voltage tapping electrode is 11gB. The CPU 21 throws the switches 15 and 16 to their A positions, and accesses the terminal Y7 of the switching circuit 17, which corresponds to the intermediate electrode 11gB. And, thus, the divided voltage of the input point B on the Y coordinate inputting sheet 10B is tapped from the intermediate electrode 11dA of the X coordinate inputting sheet 10A as X coordinate positional information. These divided voltages are converted into digital signals by the A/D converter 20 and are supplied to the CPU 21. Then the flow of control passes next to the decision step ST8.

In this decision step ST8, the CPU 21 finds the difference between the read out data and the data determined in the step ST3, and makes a decision as to the validity of said read out data by evaluating if this difference is greater than a certain threshold value or not. If the result of this decision is YES, so that the read out data is in fact valid, then the flow of control passes next to the step ST9; but, if the result of this decision is NO, so that the read out data is not in fact valid, then the flow of control passes next to the decision step ST10. In other words, in this step it is determined as to whether or not the point of the pen is in a stationary stable state, during pen input operation.

In the step ST9, the CPU 21 computes the X and the Y coordinates of the input point from the voltages on those of the intermediate electrodes which straddle said input point and which were determined in the step ST4, and from the divided voltage as determined in the step ST7. Then these X and Y coordinates are output as the final coordinate positional information for the input point, and then the flow of control passes next to leave this program portion, without doing anything further. On the other hand, in the decision step ST10, a decision is made as to whether or not the pen is still in contact with the surface of the preferred embodiment of the coordinate inputting system of the present invention. If the result of this decision is YES, so that indeed the pen is still in contact, then the flow of control passes next to the step ST7 again, to repeat the previous determination of the divided voltage tapping electrode; but, if the result of this decision is NO, so that the pen is no longer in contact, then the flow of control passes next to the decision step ST1 again, i.e. repeats this entire program fragment once again. Thus, this flow of control transfer occurs if the pen point has been moved away from the surface of the preferred embodiment of the coordinate inputting system of the present invention, without any affirmative decision result having occurred in the step ST8, and then the flow of control returns to the step ST1 and the system waits for a resumption of input operation.

According to the above operation, since the resistance of the resistive surfaces of the X coordinate inputting sheet 10A and the Y coordinate inputting sheet 10B between the input point and the divided voltage tapping electrodes is relatively small, and the input resistance of the A/D converter 20 is relatively small, the change in the input resistance due to changes in the location of the input point and the conversion error due to the operation of the A/D converter 20 are thereby minimized.

Thus, according to such a coordinate inputting system as described above, in a stage preliminary to the actual operation of inputting coordinates of the input point, a voltage is applied between the edge electrodes, and the voltage levels of said edge electrodes as well as the voltage levels upon the intermediate electrodes are all measured and are stored in the storage means as reference information. Then, when the input point is specified upon the coordinate inputting sheet as for example by the pressure of a special pen thereupon, the means for processing information obtains the voltage divided at said input point as coordinate information. Then, this positional information is compared by the detecting means with the reference information stored in the storage means, and it is detected which of said electrodes straddle the input point. Further, the validity determining means checks the validity of the input operation according to the result of comparison between the voltages upon said electrodes which straddle the input point and said reference information, so as to ensure that, if invalid input such as produced by the pressure of the hand or elbow of the operator is being produced, this circumstance is detected, and an indication of erroneous operation is provided. Thereby, loss of measurement accuracy due to invalid input operation can be prevented, and the production of a spurious or erroneous input indication, if and when the user should inadvertently press upon said coordinate inputting system with an object other than a special pen intended for such pressing, is positively prohibited.

Conclusion

Although the present invention has been shown and described in terms of the preferred embodiment thereof, and with reference to the appended drawings, it should not be considered as being particulary limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiment, or of the drawings, but solely by the scope of the accompanying claims, which follow.

We claim:

1. A coordinate inputting system, comprising:
    at least one coordinate inputting sheet, comprising a sheet body having a resistive layer, a pair of substantially parallel edge electrodes extending along opposite edges of said resistive layer and a plurality of intermediate parallel electrodes, which are substantially parallel to said pair of edge electrodes, and extend along said resistive layer between said pair of edge electrodes in a mutually spaced relationship;
    means for applying a voltage across said pair of edge electrodes to develop voltages at each of said electrodes;
    a pen for contacting said resistive layer of said sheet to select an input point;
    means for storing reference information relating to voltages on said electrodes when said voltage is applied across said edge electrodes and in the absence of any contact between said pen and said sheet;
    means for determining as axial coordinate information a divided voltage at an input point where said pen contacts with said sheet;
    means for determining which of said electrodes straddle said input point by comparing said axial coordinate information with said reference information; and
    means for determining the validity of an input operation by comparing the voltages upon said straddling electrodes with said reference information.

2. A coordinate inputting system according to claim 1, wherein said reference information includes the voltages on said electrodes when said voltage is applied between said edge electrodes, and the voltage differences between neighboring ones of said electrodes.

3. A coordinate inputting system according to claim 1 wherein at least two of said coordinate inputting sheets are provided with the electrodes of one of said sheets being angled relative to the electrodes of another of said sheets to provide X and Y coordinate input data.

4. A coordinate inputting system according to claim 3 wherein the electrodes of one of said sheets are perpendicular to the electrodes of another of said sheets.

5. A coordinate inputting system as in claim 3 further comprising a switchover circuit for sequentially supplying a voltage to said pair of edge electrodes of each of said sheets.

6. A coordinate inputting system as in claim 1 further comprising means responsive to said validity determining means for indicating an invalid input operation.

7. A coordinate inputting system comprising:
    a first coordinate input sheet comprising a first sheet body having a first resistive layer, a first pair of substantially parallel edge electrodes extending along opposite edges of said first resistive layer, and a first plurality of intermediate parallel electrodes, which are substantially parallel to said first pair of edge electrodes and extend along said first resistive layer between said first pair of edge electrodes in mutually spaced relationship;
    a second coordinate input sheet comprising a second sheet body having a second resistive layer, a second pair of substantially parallel edge electrodes extending along opposite edges of said second resistive layer, and a second plurality of intermediate parallel electrodes, which are substantially parallel to said second pair of edge electrodes and extend along said second resistive layer between said second pair of edge electrodes in mutually spaced relationship, the electrodes of said second sheet being substantially perpendicular to the electrodes of said first sheet;
    means for sequentially applying a voltage across said first and second pair of edge electrodes to sequentially develop voltages at the electrodes of said first and second sheets;

a pen for contacting said first and second sheets to select an input point having X and Y coordinates;

means for storing reference information relating to the voltages on said electrodes of each of said first and second sheets when a voltage is applied across the edge electrodes thereof and in the absence of any contact between said pen and said sheets;

means for determining, as axial coordinate information, for each of said sheets, a divided voltage at an input point where said pen contacts with said sheets;

means for determining, for each of said sheets, which of the electrodes thereof straddle said input point by comparing the axial coordinate information of a sheet with the reference information for the same sheet; and, means for determining the validity of an input operation by comparing the voltage upon the straddling electrodes of one of said sheets with said reference information for the same sheet.

* * * * *